Figure 1:
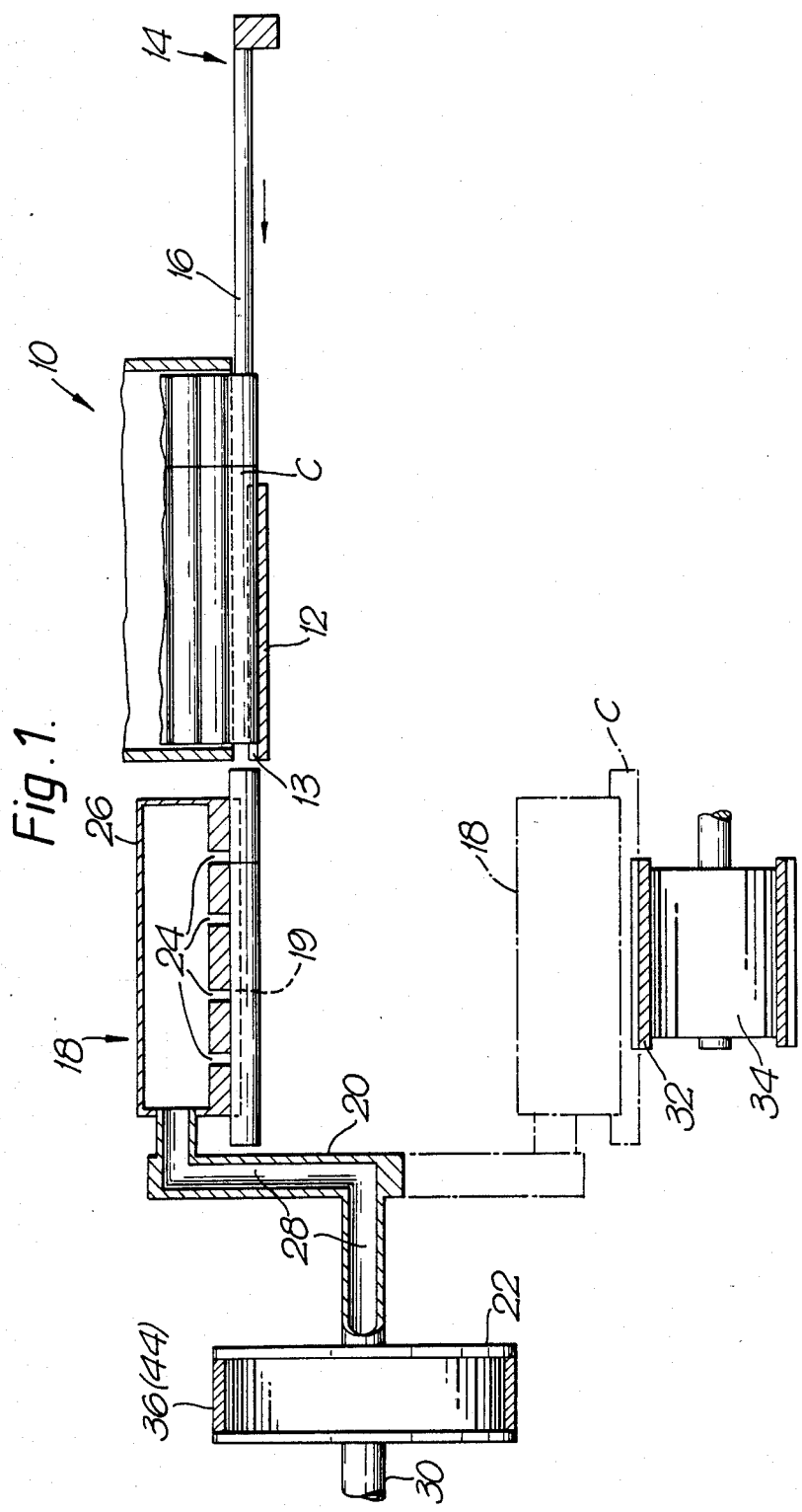

United States Patent [19]

Hinchcliffe et al.

[11] Patent Number: 4,848,561
[45] Date of Patent: Jul. 18, 1989

[54] FORMING LINES OF CIGARETTES

[75] Inventors: Dennis Hinchcliffe, Orpington; Desmond W. Molins, High Wycombe, both of England

[73] Assignee: Molins PLC, Milton Keynes, England

[21] Appl. No.: 83,335

[22] Filed: Aug. 10, 1987

[30] Foreign Application Priority Data

Aug. 8, 1986 [GB] United Kingdom ................ 8619417

[51] Int. Cl.⁴ ............................................. B65G 47/26
[52] U.S. Cl. .................................. 198/433; 198/468.4; 198/468.6
[58] Field of Search ............... 198/471.1, 475.1, 468.4, 198/468.6, 420, 429, 431, 432, 433

[56] References Cited

U.S. PATENT DOCUMENTS

| | | | |
|---|---|---|---|
| 2,861,672 | 11/1958 | Bührer et al. | 198/475.1 |
| 3,106,282 | 10/1963 | Schmermund | 198/420 X |
| 3,435,940 | 4/1969 | Seragnoli | 198/420 X |
| 3,520,394 | 7/1970 | Seragnoli | 198/420 X |
| 3,603,445 | 9/1971 | Zausch et al. | 198/418.3 |
| 3,771,639 | 11/1973 | Giatti | 198/475.1 X |
| 3,777,453 | 12/1973 | Zimmermann et al. | 198/471.1 X |
| 4,135,619 | 1/1979 | Cerboni | 198/471.1 |
| 4,296,660 | 10/1981 | Cristiani | 198/471.1 X |
| 4,449,625 | 5/1984 | Grieben et al. | 198/475.1 X |
| 4,592,374 | 6/1986 | Focke et al. | 198/478.1 X |
| 4,627,450 | 12/1986 | Focke et al. | 131/282 |
| 4,645,063 | 2/1987 | Seragnoli | 198/475.1 X |

Primary Examiner—Robert J. Spar
Assistant Examiner—D. Glenn Dayoan
Attorney, Agent, or Firm—John C. Smith, Jr.

[57] ABSTRACT

A continuous line of laterally moving cigarettes is provided by extracting a row of cigarettes from an 80-column hopper 10, supporting the row by suction on the underside of a fluted beam 18 mounted on a pair of cranks 20, and cyclically rotating the cranks to bring the speed of the beam up to that of a fluted conveyor 32, where the row is deposited at the end of a previously transferred row. From the continuous line of cigarettes shorter rows are subsequently removed by known suction drums to form a succession of groups ready for packing on a continuous packer.

22 Claims, 2 Drawing Sheets

FORMING LINES OF CIGARETTES

This invention relates to a method and apparatus for forming lines of cigarettes. More specifically the invention relates to the forming of lines of laterally moving cigarettes which are subsequently to be used particularly for forming groups of cigarettes to be packed.

Though reference will be made throughout this specification to cigarettes, it is to be understood that the invention is equally applicable to any other similar rod-like articles, for example filter plugs.

In British patent specification No. 2138382 there is disclosed a continuous cigarette packing machine in which cigarette groups are intermittently formed from several conventional hoppers before being transferred to a part of the machine which operates on a continuous basis. As an alternative there is also described, with reference to FIGS. 8 and 9 thereof, an arrangement in which a cigarette making machine and packing machine are directly linked for continuous integrated operation. However, the arrangement described is limited to a specific cigarette collation, namely a two row grouping. More importantly, there is at present still a requirement for packing machines to be fed from a cigarette mass flow, and the arrangements described in said specification do not easily lend themselves to a packing machine operable either by way of a direct link from a making machine or by accepting cigarettes as a mass flow.

According to the present invention there is provided a method of forming a continuous line of laterally moving cigarettes comprising the repeated steps of forming a row of a pre-determined number of cigarettes in a stationary carrier, moving the carrier at substantially the same speed and in the same direction of movement as the continuous line being formed, and transferring the row so as to join the trailing end of a previously transferred row forming the continuous line.

Such a continuous line may then be used to form groups of cigarettes in a continuous manner, for example as shown in the apparatus of U.S. Pat. No. 3,603,445.

The invention also provides apparatus for forming a continuous line of laterally moving cigarettes from a mass flow of cigarettes, comprising a vaned hopper, means for ejecting cigarettes from the hopper to form a row of stationary cigarettes, conveyor means for feeding a continuous line of cigarettes, and transfer means for moving said row at substantially the same speed and in the same direction of movement as the conveyor means so that the leading end of the row adjoins the trailing end of a previously transferred row forming the continuous line, said transfer means comprising carrier means repeatedly movable between a stationary position in which said row is received from the ejecting means and a moving position at which said row is transferred to the conveyor means.

The carrier means may include means supporting individual cigarettes. The carrier means may have flutes and include means for applying suction to the flutes. The conveyor means could have similar supporting means, including suction flutes. The carrier means is preferably a horizontal beam having means for applying suction thereto; and preferably the beam is movable in a vertical plane. In a preferred arrangement the beam carries the cigarettes on its underside.

The drive to the carrier means may be from a mechanical gear mechanism, but is preferably from an electric stepper motor.

Other features of the invention will become apparent from the following description.

Figure 2:
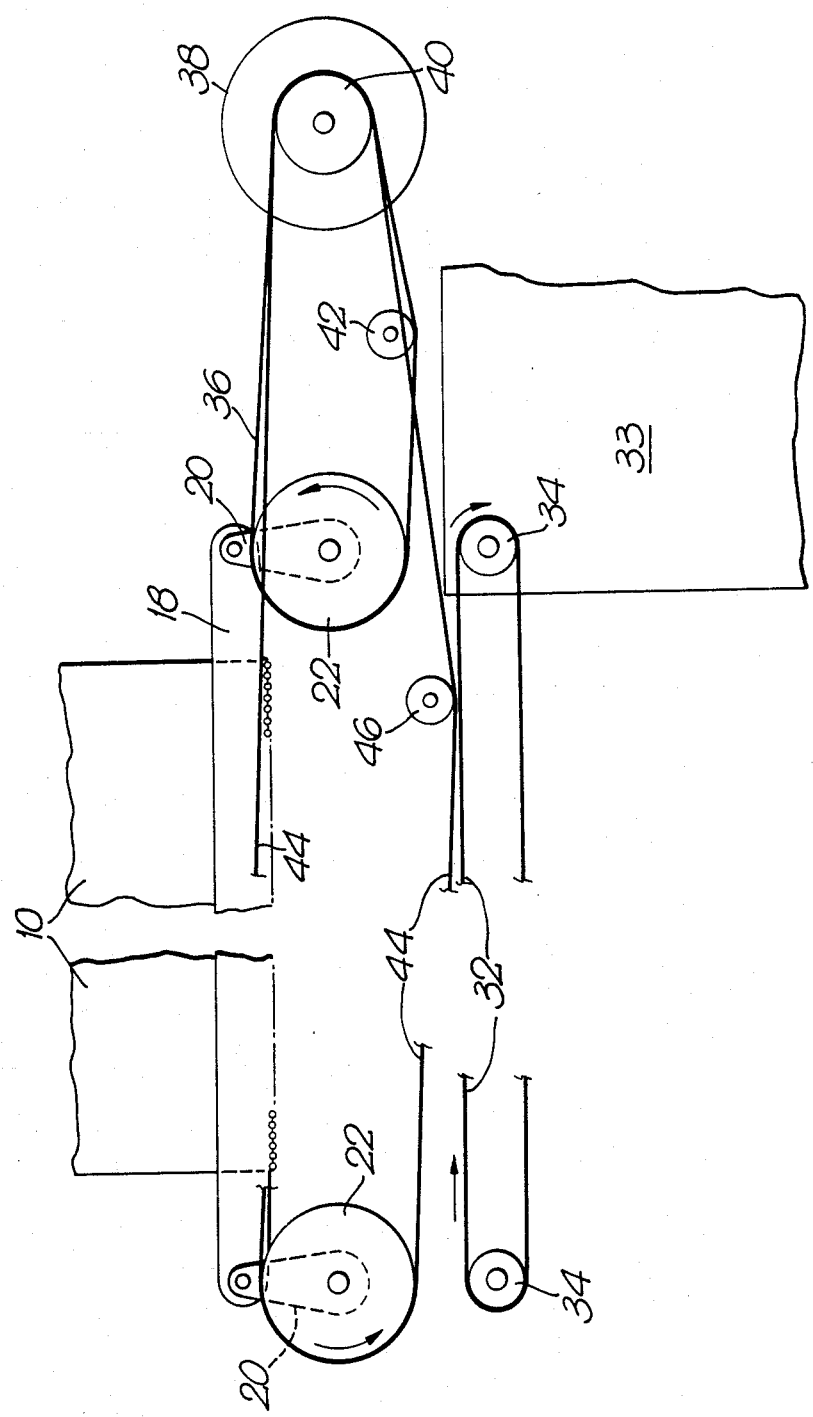

A specific embodiment of the invention will now be described, by way of example, with reference to the accompanying drawings in which:

FIG. 1 is a side view, partially in section, of apparatus according to the invention; and FIG. 2 is a front view of the apparatus of FIG. 1 drawn to a reduced scale.

In the drawings reference numeral 10 represents a conventional cigarette hopper having vertical vanes down which cigarettes are urged to descend. As can be seen from FIG. 2, the hopper 10 differs from conventional hoppers in that it is considerably wider, consisting of some 60 to 80 channels defined by vertical vanes.

Referring to FIG. 1, extending along the base of the hopper is a plate 12 which is fluted at 13 between adjacent vanes in order to accept a cigarette in each flute 13.

At the back of the hopper 10 is a pusher arrangement 14 including an ejector pin 16 positioned above each flute 13 of the base plate 12. The ejector pin 16 is movable against the rear end of the lowermost cigarette C resting in each flute to eject a cigarette from each column towards the front of the hopper.

Disposed in front of the hopper 10 is a horizontal beam 18 which is supported at each end by a crank 20 rotatable about a drum 22. The underside of the beam 18 is fluted at 19 similar to the plate 12, and extending into each flute 19 are a number of suction ports 24. The ports 24 communicate with a chamber 26 inside the beam, which in turn communicates through a passageway 28 in the crank 20 with a tube 30 at the front of the drum 22, which is connected to a source of suction (not shown).

Underneath the beam 18 is a conveyor band 32 which has a fluted outer surface and on the upper run of which cigarettes are transportable. The band 32 is trained over a pair of pulleys 34, one of which is driven in a clockwise direction as shown. Suction ports (not shown) are provided in the band 32 in order to securely hold the cigarettes in the flutes.

The level of the upper run of the band 32 is so arranged that when the beam 18 reaches its lowermost position, shown chain-dotted in FIG. 1, a cigarette C can be transferred to a flute in the band 32.

Referring now particularly to FIG. 2, the drum 22 to the right of the hopper 10 is driven by a timing belt 36 from an intermittent cyclic drive mechanism 38 via a pulley 40. The band 36 is tensioned by a jockey wheel 42.

The pulley 40 also drives the left-hand drum 22 through a timing belt 44. The belt 44 is likewise tensioned by a jockey wheel 46 similar to jockey wheel 42.

The hopper 10, beam 18, and conveyor 32 form part of a cigarette packing machine: the part of the machine downstream of the conveyor 32 is indicated generally at 33 in FIG. 2.

The operation of the apparatus will now be described.

With the beam 18 in the position shown in solid lines a row of cigarettes is ejected or plunged out by the pushers 14. Thus the row is horizontally transferred to the left, as viewed in FIG. 1, onto the underside of the beam 18 where it is held by suction applied through the ports 24. As soon as the horizontal transfer of cigarettes C is complete, the drive mechanism 38 begins to rotate the cranks 20 counter-clockwise in the direction shown in FIG. 2. The drive continues to accelerate the cranks to bring the beam 18 down to the position shown in chain-dotted lines in FIG. 1.

At this point it is arranged that the speed of the beam 18 is equal to that of the band 32, and at this stage the cigarette row is therefore transferred to the band 32, suction being released from the ports 24, while suction is applied to the flutes in the band. The cranks 20 continue to be driven around, bringing the beam 18 towards the uppermost position again, the cranks being decelerated to bring the beam to rest at that position ready to receive the next row of cigarettes.

The timing of the rotation of the cranks 20 is so arranged that as a row of cigarettes is fed to the band 32 the leading end of the row of cigarettes being transferred from the beam 18 is immediately behind the trailing end of the previous row deposited on the band 32.

The purpose of the second driving belt 44 (which may appear redundant) is to ensure that if the mechanism were to come to rest in the midway position (in particular halfway up) both cranks 20 would subsequently start to be rotated in the same direction.

The width of the beam 18 may be considerably less than shown, and it may then be spaced away from the hopper 10 to form a wider gap across which the cigarettes have to pass in being transferred to the underside of the beam. Since with a beam of lesser width the time required to transfer cigarettes onto the beam may be less, this enables the beam to stop for a shorter period of its cycle, thus allowing it to operate at a higher speed. In this case it may be desirable to apply some suction to the flutes 13 under the hopper in order to maintain the alignment of the cigarettes as they are being transferred across such wider gap to the beam.

Though the cyclic drive 38 may be mechanical gearing mechanism, it will be apparent that one or both of the cranks 20 can equally well be driven directly by an electronically controlled motor such as a stepping motor.

Furthermore though the path of the beam described above is circular, it may be arranged (in a manner well known in the art) for the beam to travel in a differently shaped path, e.g. an elliptical or ovoidal path, such that it is travelling with the band 32 for a greater portion of its cycle.

From the output of the conveyor band 32 the continuous line of cigarettes may be removed in sections in the machine part 33, by say three drums to form three rows of cigarettes per group, in a manner such as disclosed in U.S. Pat. No. 3,603,445.

If it is desired to have a direct link from a cigarette making machine to a packing machine incorporating the apparatus herein described, then the cigarettes can be fed directly onto the band 32, with the remaining mechanism described being out of action.

We claim:

1. A method of forming a continuous line of adjoining laterally moving cigarettes on a continuously moving conveyor comprising the repeated steps of forming a row of a predetermined number of cigarettes on a carrier while said carrier is stationary, moving the carrier with said formed row of cigarettes thereon in timed relationship with and at substantially the same speed and in the same direction of movement as the continuous line being formed on said continuously moving conveyor, and while said carrier is moving transferring the row from said carrier onto said continuously moving conveyor so as to join the trailing end of a previously transferred row to form the continuous line comprising said rows in adjoining relationship on said conveyor.

2. Apparatus for forming a continuous line of adjoining laterally moving cigarettes from a mass flow of cigarettes, comprising a vaned hopper, means for ejecting cigarettes from said hopper to form a row of stationary cigarettes, conveyor means for continuously feeding a continuous line of laterally moving cigarettes at a predetermined speed and direction of movement, and transfer means for moving said row at substantially said predetermined speed and direction of movement of cigarettes continuously conveyed by said conveyor means so that the leading end of the row adjoins the trailing end of a previously transferred row forming the continuous line, said transfer means comprising carrier means repeatedly movable between a stationary position in which said row is received from said ejecting means and a moving position at which said row is transferred to said conveyor means.

3. Apparatus as claimed in claim 2, wherein the carrier means includes means for supporting individual cigarettes.

4. Apparatus as claimed in claim 3, wherein the carrier means is formed with flutes and includes means for applying suction to the flutes.

5. Apparatus as claimed in claim 4, wherein the carrier means comprises a substantially horizontal beam.

6. Apparatus as claimed in claim 5, including means for moving the beam in a substantially vertical plane.

7. Apparatus as claimed in claim 2, including drive means for cyclically moving said carrier means in a closed path.

8. Apparatus as claimed in claim 7, wherein said drive means includes means arranged to accelerate said carrier means from rest in said stationary position to substantially the speed of said conveyor means while the carrier means is moving in a first portion of said path, and to decelerate the carrier means as it returns to said stationary position during a second portion of said path.

9. Apparatus as claimed in claim 8, wherein the drive means includes means arranged so that the period taken for said carrier means to complete one circuit of said path is the same as the period taken by the conveyor means to move a cigarette by a distance corresponding to the length of a row.

10. Apparatus as claimed in claim 8, wherein the drive means includes an electric stepper motor.

11. Apparatus as claimed in claims 7, including further drive means for driving said conveyor means, said drive means being synchronised with said further drive means so that said carrier means and said conveyor means move at substantially the same speed at said moving position.

12. Apparatus for forming a continuous line of laterally moving cigarettes from a mass flow of cigarettes, comprising a vaned hopper, means for ejecting cigarettes from the hopper to form a row of stationary cigarettes, conveyor means for feeding a continuous line of cigarettes, and transfer means for moving said row at substantially the same speed and in the same direction of movement as cigarettes conveyed by the conveyor means so that the leading end of the row adjoins the trailing end of a previously transferred row forming the continuous line, said transfer means comprising carrier means repeatedly movable between a stationary position in which said row is received from the ejecting means and a moving position at which said row is transferred to the conveyor means, said carrier means comprising a substantially horizontal beam having a plurality of flutes on the underside thereof and means for applying suction to said flutes.

13. A method of forming a continuous line of adjoining laterally moving cigarettes comprising:
    (a) continuously operating a conveyor means to feed a continuous line of adjoining laterally moving cigarettes at a predetermined speed and direction of movement;
    (b) repeatedly forming a row of a predetermined number of cigarettes on a carrier while said carrier is at a stationary position;
    (c) after forming each said row, moving said carrier in timed relationship with said conveyor means from said stationary position to a moving position at which said carrier is moved at substantially said predetermined speed and direction of movement of said conveyor means; and
    (d) while said carrier is at said moving position, transferring said row from said carrier to said continuously operating conveyor means such that the leading end of said row adjoins the trailing end of a previously transferred row to form the continuous line comprising said rows in adjoining relationship on said conveyor means.

14. The method according to claim 13 wherein said carrier is accelerated from rest at said stationary position to substantially said predetermined speed of said conveyor means at said moving position and then, after transferring said row, decelerated during its return to said stationary position.

15. Apparatus for forming a continuous line of adjoining laterally moving cigarettes from a mass flow of cigarettes, comprising:
    (a) conveyor means for continuously feeding said continuous line of adjoining laterally moving cigarettes at a predetermined speed and direction of movement;
    (b) carrier means, cyclically movable along a path from a stationary position to a moving position and from said moving position to said stationary position, for supporting a row of a predetermined number of cigarettes and transferring said row of cigarettes from said carrier means to said conveyor means at said moving position;
    (c) a hopper for containing a plurality of cigarettes;
    (d) means for ejecting cigarettes from said hopper onto said carrier means at said stationary position to form said row of cigarettes on said carrier means; and
    (e) drive means connected to said carrier means and said conveyor means for continuously moving said conveyor means and moving said carrier means along said path in timed relationship with the continuous movement of said conveyor means and including moving said carrier means at said moving position at substantially said predetermined speed and direction of movement of said conveyor means, such that the leading end of a row transferred from said carrier means to said conveyor means adjoins the trailing end of a previously transferred row to form the continuous line comprising said rows in adjoining relationship on said conveyor means.

16. The apparatus as claimed in claim 15 wherein said drive means is adapted to accelerate said carrier means along said path from rest at said stationary position to substantially said predetermined speed of said conveyor means at said moving position and then, after transferring said row, to decelerate said carrier means during movement along said path from said moving position to said stationary position.

17. The apparatus as claimed in claim 15 wherein said drive means is adapted to cause said carrier means to make a complete cyclical movement along said path from said stationary position to said moving position and back to said stationary position in the same time period as said conveyor means moves a cigarette a distance corresponding to the length of a row.

18. The apparatus as claimed in claim 15 further comprising further drive means for driving said conveyor means, said drive means and said further drive means being synchronized such that at said moving position said carrier means moves at substantially said predetermined speed of said conveyor means.

19. The apparatus as claimed in claim 15 wherein said carrier means comprises means for supporting the individual cigarettes of said row on the underside thereof.

20. Apparatus for forming a continuous line of adjoining laterally moving cigarettes from a mass flow of cigarettes, comprising:
    (a) conveyor means for feeding said continuous line of adjoining laterally moving cigarettes at a predetermined speed and direction of movement:
    (b) carrier means, cyclically movable along a path from a stationary position to a moving position and from said moving position to said stationary position, for supporting a row of a predetermined number of cigarettes and transferring said row of cigarettes from said carrier means to said conveyor means at said moving position;
    (c) a hopper for containing a plurality of cigarettes;
    (d) means for ejecting cigarettes from said hopper onto said carrier means at said stationary position to form said row of cigarettes on said carrier means; and
    (e) drive means connected to said carrier means for moving said carrier means along said path in timed relationship with the movement of said conveyor means and including moving said carrier means at said moving position at substantially said predetermined speed and direction of movement of said conveyor means, said drive means being adapted to cause said carrier means to make a complete cyclical movement along said path from said stationary position to said moving position and back to said stationary position in the same time period as said conveyor means moves a cigarette a distance corresponding to the length of a row;
    (f) whereby the leading end of a row transferred from said carrier means to said conveyor means adjoins the trailing end of a previously transferred row to form the continuous line comprising said rows in adjoining relationship on said conveyor means.

21. Apparatus for forming a continuous line of laterally moving cigarettes from a mass flow of cigarettes, comprising a vaned hopper, means for ejecting cigarettes from the hopper to form a row of stationary cigarettes, conveyor means for feeding a continuous line of cigarettes, and transfer means for moving said row at substantially the same speed and in the same direction of movement as cigarettes conveyed by the conveyor means so that the leading end of the row adjoins the trailing end of a previously transferred row forming the continuous line, said transfer means comprising carrier means and drive means for repeatedly moving said carrier means between a stationary position in which said row is received from the ejecting means and a moving position at which said row is transferred to the conveyor means, said carrier means comprising a predetermined number of flutes extending in a substantially straight row and said drive means being adapted to move said carrier means between said stationary and moving positions in a direction which is transverse to the length of said row.

22. The apparatus as claimed in claim 21 wherein the orientations of said row of flutes in said carrier means in both said stationary and moving positions are parallel.

* * * * *